INVENTOR
JEAN FIRMIN JAMMET

United States Patent Office 3,511,717
Patented May 12, 1970

3,511,717
ELECTROCHEMICAL CELLS WITH SEALING ARRANGEMENT
Jean Firmin Jammet, Poitiers, France, assignor to Societe des Accumulateurs Fixes et de Traction (Societe Anonyme), Romainville, France, a French company
Filed Nov. 7, 1967, Ser. No. 681,158
Claims priority, application France, Nov. 16, 1966, 83,884, Patent 1,509,008
Int. Cl. H01m 1/02
U.S. Cl. 136—133
6 Claims

ABSTRACT OF THE DISCLOSURE

Electrochemical cell embodying a cup-shaped electrode and a rod type electrode located therein and projecting upwardly and outwardly of a cover for the cup-shaped electrode and capped by a metallic contact cap, the cover preferably of plastic material being provided with a re-entrant skirt portion through which the rod type electrode passes, the skirt portion being surrounded by an elastic member such as a coil spring or split ring which tightly clamps and seals the skirt portion to the rod type electrode in a plurality of adjacent zones or over a continuous zone of substantial width.

SUMMARY OF INVENTION

The invention relates to improvements in the sealing of electrochemical cells and more particularly to those of the cylinder type in which the external negative electrode, of cupped form, is located in a tubular insulative casing of plastic material terminating at its top end in a cover of the same material. The cover is provided at its center with a re-entrant tubular skirt portion in which a rod serving as the positive electrode is positioned, the tip of said rod, projecting from the outer end of the skirt portion and being enshrouded by a metal contact cap which constitutes the positive terminal of the cell.

Researchers and manufacturers have been preoccupied with the aim of effectively sealing cells of this kind for many years now. A very wide range of solutions to this problem has been resorted to, but in practice the majority of them have turned out to be unsatisfactory for one reason or another. Electrochemical cells of this kind must continuously match up with new technical requirements so that approaches which might have been satisfactory at the time of conception are subsequently rendered obsolete or out-of-date.

The device whose main function is to provide a satisfactory seal, must meet a number of important secondary requirements. In particular, it is necessary that this device should take up the minimum possible amount of space in the cells and comprise as small as possible a portion of their weights so that the energy/volume and energy/weight ratios are not reduced. This device may also have to be designed to allow escape to the outside of part at least of the gases developed during use of the cells, whilst at the same time preventing both escape of electrolyte and swelling of the cells.

With the latest technical requirements in mind and with a knowledge of what battery manufacture entails, I have been working towards an efficient but simple solution to this problem. Thus, the problem of sealing at the bottom part of such a cell has been resolved in a highly satisfactory manner by the device described in my U.S. Pat. No. 3,342,644 although the situation is not so satisfactory where the top part of the cell is concerned, i.e. the part between the plastic cover and the carbon rod. A solution to the problem of sealing the top part of the cell has been described in my U.S. Pat. No. 3,168,420; this solution was aimed at achieving the requisite seal by pressing the skirt of the plastic cover onto the carbon rod by using a metal reinforcing disc over a single very narrow zone of said skirt portion. The extremely narrow pressure area effected by the edge of the disc does not meet modern sealing requirements fully.

Objects and features of the present invention are to effect material improvements in devices used for sealing the top part of an electrochemical cell of the kind hereinbefore mentioned.

The subject of the invention is an electrochemical cell of the cylinder type in which the external negative electrode, of cup form, is arranged in an insulative casing of plastic material terminating at its top end in a cover of like material provided centrally with a re-entrant tubular skirt portion in which a rod which serves as positive electrode is mounted, the tip of this rod, projecting outwardly from the skirt portion and being enshrouded by a metal contact cap which constitutes the positive terminal of the battery, the arrangement being characterized by the fact that elastic means such as a spring ring clip, split ring or similar clamping member is disposed around the skirt portion in such a manner as to compress it over a continuous wide zone or in several zones, into sealing contact with the rod.

Other features and objects of the invention will become apparent from the ensuing detailed description and the accompanying drawing forming a part thereof and wherein.

Figure 1:
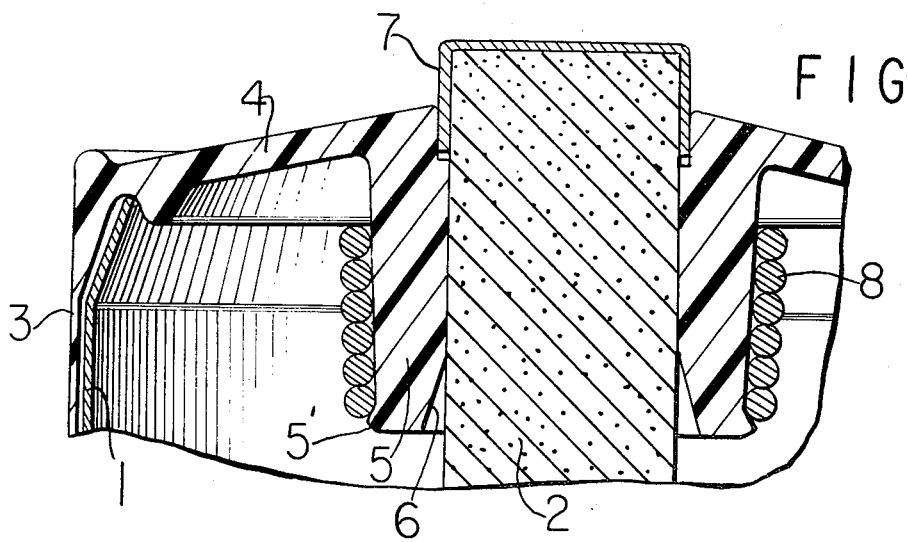
FIG. 1 is a partial section of a cell at its top portion provided with one embodiment of a seal in accordance with the invention.
Figure 2:
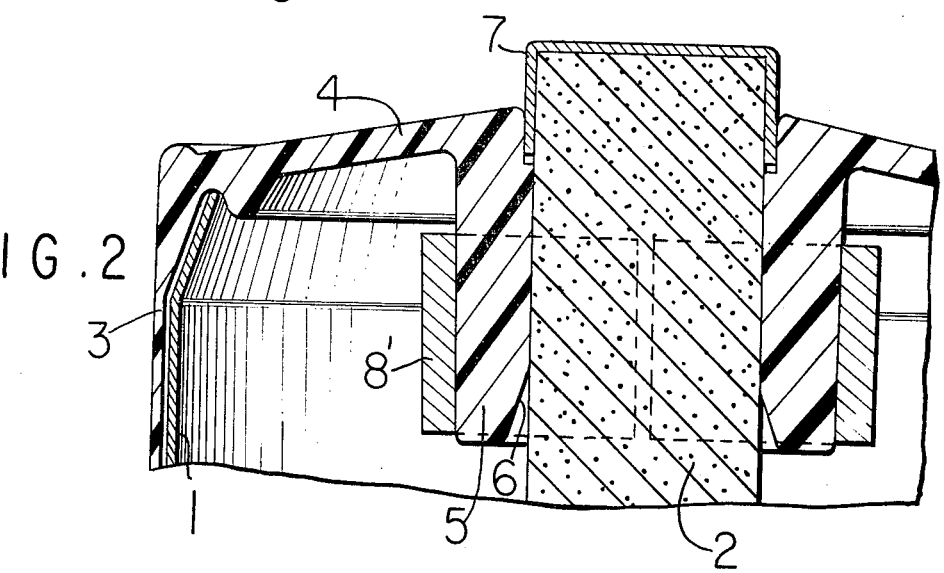
FIG. 2 is a similar view utilizing a different embodiment.

In FIGS. 1 and 2, the references 1 and 2 respectively designate the zinc cupped case acting as negative electrode, and the rod, of carbon, for example, acting as positive electrode.

The cupped case 1 is arranged in a casing or sheath 3 of plastic material, said sheath terminating at its upper end in a cover 4 equipped centrally with a re-entrant tubular skirt portion 5 in which the rod 2 is mounted. The top rim part of the cupped case 1, which is tapered slightly inwards, abuts substantially against the complementary shaped internal face of the cover 4. The top end of the positive electrode rod 2 projects outwardly beyond the cover 4 and is enshrouded as by a metallic contact cap 7. The internal lower end part of the skirt portion 5 is provided with a chamfer 6 in order to facilitate the force-fitting of the rod 2 into said skirt portion 5.

In FIG. 1, the reference 8 designates a spring, of substantially cylindrical form, which is force-fitted over the external wall of the skirt portion 5 prior to the introduction of the electrode rod 2 therein, this spring ensuring that the said skirt is radially clamped onto the rod 2 over a wide zone corresponding to the number of turns in said spring.

The spring 8 is constituted by a material which is inert with respect to the electrolyte, such as an appropriately resistant metal, or a metal protected by any appropriate electrolyte resistant coating means, or may be entirely itself of springy plastic material.

The base of the skirt portion 5 may optionally be provided with a rib 5' which prevents any eventually downward displacement movement of the spring 8 on the skirt 5 once the former has been mounted on said skirt portion 5. In addition, any tendency of the spring 8 towards upward movement on said skirt portion 5 can be inhibited by giving the external surface of the skirt portion 5 a slight taper.

The spring 8 may be replaced by a ring clip or resilient split ring as is illustrated in FIG. 2, where it is indicated by the reference 8' and is made, for example, of polyamide.

Advantageously, the rod may be provided at its exterior, level with the skirt, with one or more recesses or grooves designed to improve sealing.

The rod acting as positive electrode in a battery of this kind is conventionally made of carbon where the electrolyte is a saline one. Where an alkaline battery is concerned, for example, the rod may be made of a metal which is resistant to an alkaline electrolyte environment, or which has been rendered so resistant as by application of a resistant coating or the like by any appropriate process, and it will consequently be easier in this event to provide it with the said grooves at the part situated within or surrounded by the skirt.

Figure 3:
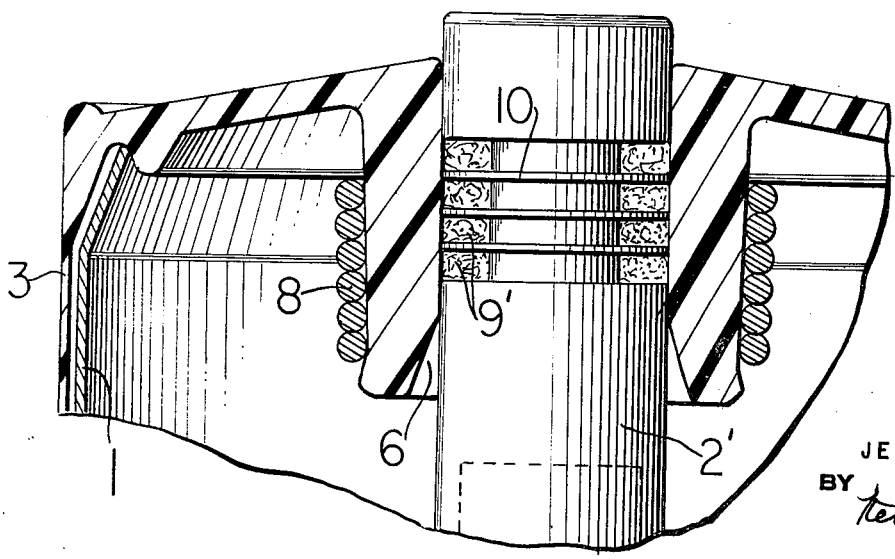
FIG. 3 is a further similar view showing still a further embodiment.

FIG. 3 illustrates an embodiment in accordance with the invention, in which the rod has the aforesaid feature.

In this figure, references identical to those of FIGS. 1 and 2, have the same significance.

The metal rod is indicated by the reference 2' and in the region of the skirt portion 5 contains annular grooves 9 delimiting land portions 10 against the edges of which the corresponding parts of the walls of the skirt portion 5 are applied. Either the spring 8 as shown or a ring-like ring 8' may be used to apply compressive forces to skirt portion 5.

The reduction in the area over which the compressive force acts, produces a local increase in the pressure around the peripheries of the land portions 10. This arrangement thus has an additional advantage in that it creates a kind of labyrinth arrangement, constituted by the grooves 9, with respect to any electrolyte tending to escape. The grooves 9 of this labyrinth arrangement may advantageously be filled, partially at least, with a suitable absorbent or bibulous material 9' that is unaffected by the electrolyte. In addition, if the rod 2' is metallic, it need not be provided with a contact cap 7 and the casing or sheet 3 of plastic material can be applied higher up on the rod instead of taking the forms illustrated in FIGS. 1 and 2.

The electrode rod 2' has been shown as being solid, but it could also be hollow over part at least of its length, in particular in order to reduce its weight and, similarly, only those of its portions in contact with the skirt portion 5 need in fact be of a metallic nature. Moreover, it could terminate lower down in a hollow metallic part force-fitted over a carbon rod.

Before introducing any of the rods into the skirt portion, the former may be coated with a substance which will facilitate assembly and improve sealing. Advantageously, pitch could be used for this purpose.

While specific embodiments have been described and illustrated, these have been presented exclusively by way of example. Variations are possible within the scope of the appended claims and are contemplated. There is no intention, therefore, of limitation to the abstract or disclosure herein presented.

What is claimed is:

1. An electrochemical cell of cylinder type having an external cup-shaped electrode covered by an external casing which terminates in a transverse cover provided with a re-entrant skirt portion in which a positive rod-like electrode is mounted, said rod-like electrode being mounted in said skirt portion with a force fit, and elastic means fitted on said skirt portion and having substantial area of clamping contact with said skirt portion to clamp it securely and in sealing relationship onto said rod-like electrode.

2. An electrochemical cell according to claim 1, wherein said elastic means is a helical spring having a plurality of turns providing a wide area of clamping contact with said rod-like electrode.

3. An electrochemical cell according to claim 1, wherein said elastic means is an elastic split ring of substantial width providing a wide continuous area of clamping contact with said rod-like electrode.

4. An electrochemical cell according to claim 1, wherein said rod-like electrode is grooved in the region in which said skirt portion is located.

5. An electrochemical cell according to claim 1, wherein said rod-like electrode is of metallic material at least in the region thereof in which said skirt portion is located.

6. An electrochemical cell according to claim 5, in which said rod-like electrode has grooves in said region, said grooves containing bibulous material.

References Cited

UNITED STATES PATENTS

| | | | |
|---|---|---|---|
| 3,168,420 | 2/1965 | Jammet | 136—133 |
| 3,320,094 | 5/1967 | Yamamoto et al. | 136—133 |

WINSTON A. DOUGLAS, Primary Examiner

D. L. WALTON, Assistant Examiner